United States Patent
Zhang et al.

(10) Patent No.: US 8,874,711 B1
(45) Date of Patent: Oct. 28, 2014

(54) CLASSIFYING OBJECTS ON A CABLE MODEM TERMINATION SYSTEM USING TAGGING

(75) Inventors: Dashuai Zhang, Shanghai (CN); Jie Meng, Shanghai (CN); Jun Zhang, Shanghai (CN); Liang Hong, Shanghai, CA (US)

(73) Assignee: Cisco Technology, Inc., San Jose, CA (US)

( * ) Notice: Subject to any disclaimer, the term of this patent is extended or adjusted under 35 U.S.C. 154(b) by 546 days.

(21) Appl. No.: 12/834,970

(22) Filed: Jul. 13, 2010

(51) Int. Cl.
G06F 15/16 (2006.01)
H04L 12/28 (2006.01)
H04L 12/24 (2006.01)
G06F 15/173 (2006.01)

(52) U.S. Cl.
CPC ........ H04L 12/2801 (2013.01); H04L 41/0893 (2013.01)
USPC ........... 709/223; 709/220; 370/254; 725/111; 726/1

(58) Field of Classification Search
CPC ............ H04L 12/2801; H04L 41/0213; H04L 41/0893; H04N 21/6118; H04N 21/6168
USPC ........ 709/223, 220; 726/1; 725/111; 370/254
See application file for complete search history.

(56) References Cited

U.S. PATENT DOCUMENTS

| | | | |
|---|---|---|---|
| 6,578,074 B1 * | 6/2003 | Bahlmann | 709/220 |
| 7,334,258 B1 * | 2/2008 | Ford et al. | 726/4 |
| 7,568,093 B2 | 7/2009 | Broberg et al. | |
| 7,600,003 B1 | 10/2009 | Okmianski et al. | |
| 7,620,055 B1 * | 11/2009 | Chandran et al. | 370/395.5 |
| 7,865,727 B2 | 1/2011 | Zeng et al. | |
| 8,606,911 B2 * | 12/2013 | Raleigh et al. | 709/224 |
| 2003/0145075 A1 * | 7/2003 | Weaver et al. | 709/223 |
| 2004/0244043 A1 * | 12/2004 | Lind et al. | 725/111 |
| 2005/0152369 A1 * | 7/2005 | Ambe et al. | 370/392 |
| 2006/0098643 A1 * | 5/2006 | Pfeffer et al. | 370/389 |
| 2006/0120369 A1 * | 6/2006 | Chandran et al. | 370/390 |
| 2007/0076717 A1 * | 4/2007 | Limb et al. | 370/390 |
| 2007/0150927 A1 * | 6/2007 | Chapman | 725/111 |
| 2007/0180483 A1 * | 8/2007 | Popoviciu et al. | 725/111 |
| 2007/0223513 A1 * | 9/2007 | Pantelias et al. | 370/442 |
| 2008/0239993 A1 * | 10/2008 | Pfeffer et al. | 370/259 |
| 2010/0005344 A1 * | 1/2010 | Gyles et al. | 714/45 |
| 2010/0061379 A1 * | 3/2010 | Parandekar et al. | 370/395.53 |
| 2010/0254283 A1 * | 10/2010 | Hanks | 370/254 |
| 2010/0325217 A1 * | 12/2010 | Mody et al. | 709/206 |
| 2012/0120807 A1 * | 5/2012 | Woundy et al. | 370/236 |
| 2013/0136031 A1 * | 5/2013 | Schmidek et al. | 370/254 |
| 2014/0047503 A1 * | 2/2014 | Marshall et al. | 726/1 |

* cited by examiner

*Primary Examiner* — Alina N Boutah

(74) *Attorney, Agent, or Firm* — Edell, Shapiro & Finnan, LLC

(57) ABSTRACT

Techniques are provided herein for tagging configurable objects. The configurable object is part of a cable system and is configured to be managed by a cable modem termination system (CMTS). In response to determining that a tag rule matches one or more properties of the configurable object, the first tag is associated with the configurable object. A record of the configurable object and the associated tag is generated or stored within the CMTS.

21 Claims, 7 Drawing Sheets

FIG. 4

| Tag ID | Priority | Rule ID | Rule ID | ... | Rule ID |
|---|---|---|---|---|---|
| tag_1 | 2 | rule_1 | | | |
| tag_2 | 1 | rule_1 | rule_2 | ... | rule_z |
| tag_2-1 | n/a | rule_3 | rule_4 | | |
| tag_3 | 4 | rule_1 | rule_5 | | |
| tag_4 | 3 | rule_2 | ... | | |
| .... | ... | ... | ... | | |
| tag_x | 6 | rule_6 | rule_7 | | |

US 8,874,711 B1

CLASSIFYING OBJECTS ON A CABLE MODEM TERMINATION SYSTEM USING TAGGING

TECHNICAL FIELD

The present disclosure relates to cable communications systems and methods, and more specifically to classifying cable modems, and other entities or objects within a cable modem termination system (CMTS) by way of a general tagging arrangement.

BACKGROUND

Embedded systems are computer systems that are usually designed for a specific task or application in which the operating system (OS) is "embedded" within a device. Many devices with embedded systems, once powered up, are expected to run for long periods of time, even years, without error. Example devices using embedded systems include modems, routers, cable set-top boxes, traffic light control systems, cellular telephones or remote base stations, remote CMTSs, and the like. When these example devices are powered up, they run as designed and without much human intervention. Many of these device employ real-time operating systems (RTOSs) to ensure reliable operation and error event handling, i.e., they are fault tolerant and may be used in critical applications, such as in medical devices, or in aircraft and guidance systems.

In contrast, a general purpose computer, such as a personal computer (PC), is not designed for a specific task. When a general purpose computer is powered up it generally must be "told" what to do, i.e., a second application is usually launched that tells the general purpose computer how it is to operate. Thus, general purpose computer must be designed to handle a wide variety of tasks and must be scalable, i.e., it must be able to take on additional memory, if needed, or provide hardware expansion slots to accommodate the variety of tasks. Embedded systems, on the other hand, may be optimized for the task at hand, thereby reducing unit manufacturing costs. As such, embedded systems may have limited memory, or be tied to a particular operating system, set of hardware interfaces, or industry standards, and may not have the flexibility to run a variety of software applications.

BRIEF DESCRIPTION OF THE DRAWINGS

FIG. 4 is an example table that generally depicts a relationship between tags, their priority, and rules associated with the tags.

DESCRIPTION OF EXAMPLE EMBODIMENTS

Overview

Techniques are provided herein for determining whether a rule associated with a first tag matches one or more properties of a configurable object. The configurable object is part of a cable system and is configured to be managed by a cable modem termination system (CMTS). In response to determining that the rule matches one or more of the properties of the configurable object, the first tag is associated with the configurable object. A record of the configurable object and the associated first tag is generated within the CMTS.

EXAMPLE EMBODIMENTS

Figure 1:
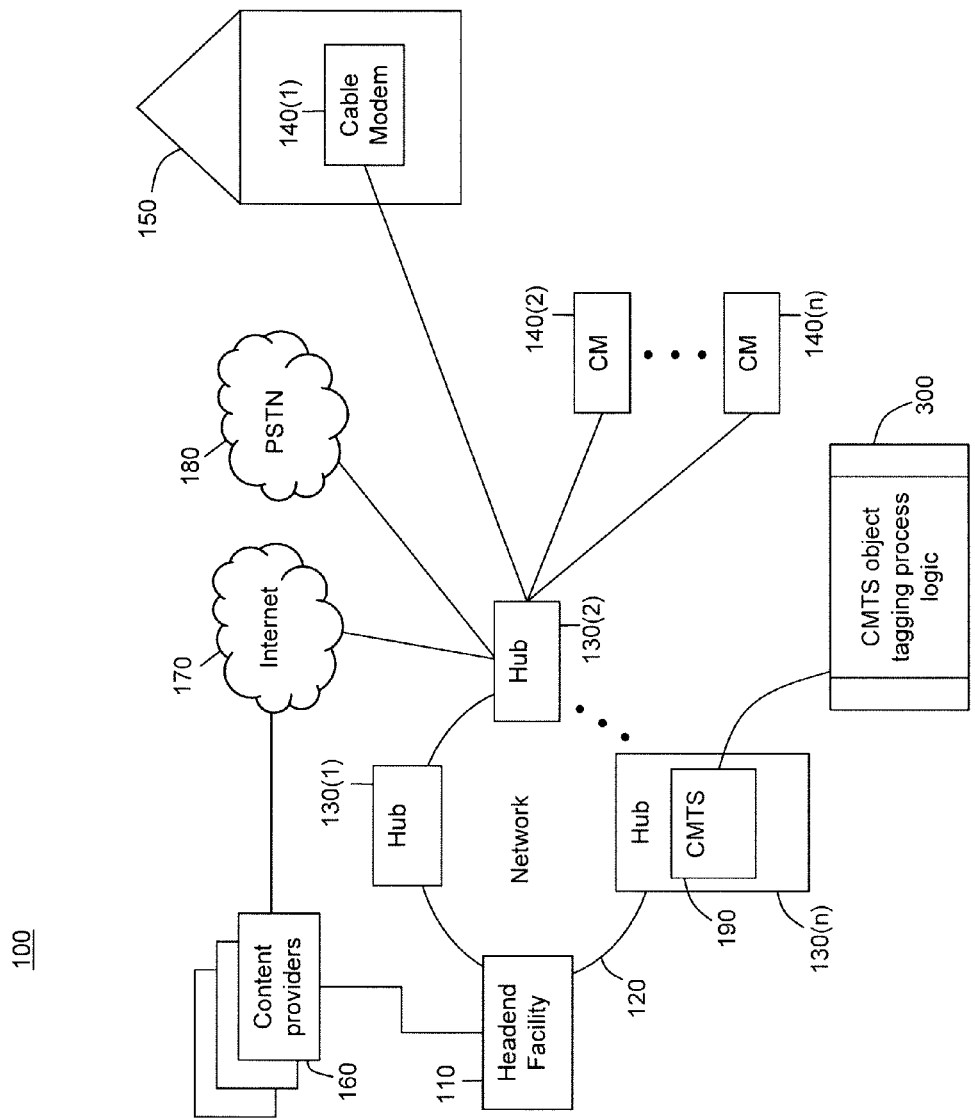
FIG. 1 is an example of a block diagram of a cable television distribution system with a CMTS that implements CMTS object tagging process logic configured to classify objects within the CMTS according to properties of individual objects.

Referring first to FIG. 1, an example cable television distribution system or network 100 is shown. The system 100 includes a headend facility (HEF) 110, a network 120, a plurality of hubs 130(1)-130(n), and a plurality of cable modems (CMs) 140(1)-140(n) with CM 140(1) residing in a customer premise 150. The HEF 110 is connected to various content providers 160 for providing media content (e.g., movies, television channels, etc.). The media content is distributed by HEF 110 to hubs 130 via network 120 (e.g. a synchronous optical network (SONET), synchronous digital hierarchy (SDH) network, or IP network). The content is further distributed by hubs 130 to the plurality of CMs 140(1)-140(n) in the form of switched digital video or Internet Protocol (IP) television. Each of the hubs 130 is also connected to the Internet 170 and the public switched telephone network (PSTN) 180 for providing Internet and telephony services (e.g., to and from customer premise 150). Media content may also be distributed by content providers 160 via Internet 170.

Within each of the hubs 130(1)-130(n) is a CMTS, e.g., CMTS 190 shown in connection with hub 130(n). The hubs 130(1)-130(n) also typically contain other networking and connectivity components that will be generally described hereinafter. Typically a CMTS is used for data services and acts a bridge between IP based services such as the Internet and IP television, and the cable operator's radio frequency (RF) based network. For example, downstream Internet traffic (from the CMTS to the CMs) is usually RF modulated onto a quadrature amplitude modulation (QAM) television channel, while upstream traffic (from the CMs to the CMTS) is RF modulated using a different frequency band from that used by the downstream traffic. The CMTS to CM interface is specified by the cable industry's Data Over Cable Service Interface Specification (DOCSIS) standard. CMTSs are rack mounted systems with various line cards and have embedded system characteristics as described above. The CMTS 190 will be described in greater detail in connection with FIG. 2.

One or more of the CMTSs within hubs 130 may each implement CMTS object tagging process logic 300. The CMTS object tagging process logic 300 will be generally described in connection with FIGS. 1 and 2, and described in greater detail in connection with FIGS. 3, 6, and 7. The CMs 140(1)-140(n) are typical cable industry devices that act as a bridge between the cable network and the home network (not shown) for providing data services (e.g., Internet, telephony, Internet Protocol television services, etc.). The CMs 140(1)-140(n) are DOCSIS or EuroDOCSIS compliant.

Figure 2:
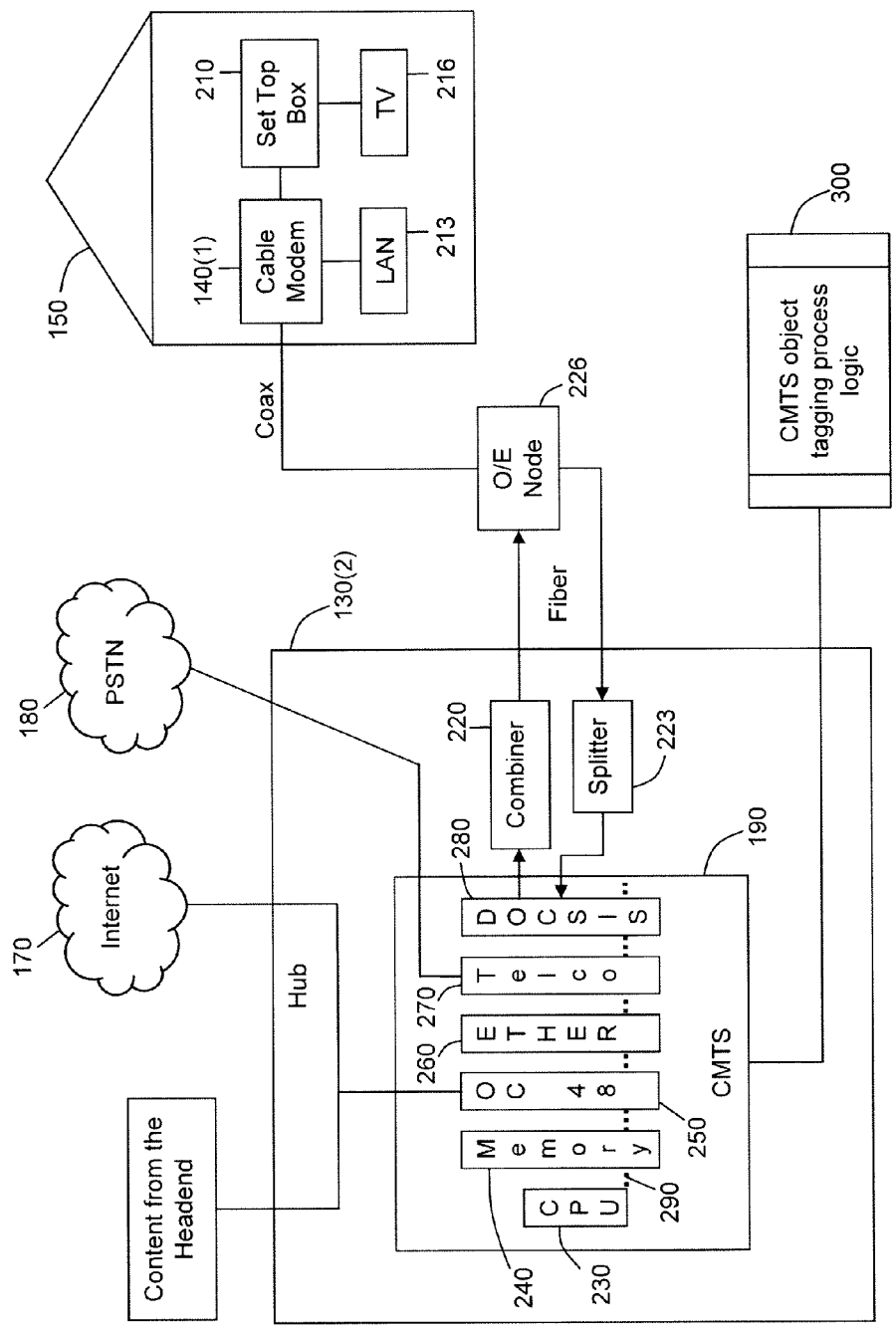
FIG. 2 is an example of a block diagram of a hub within the system of FIG. 1 with a CMTS that is configured to classify cable modems (CMs) and other objects.

Referring to FIG. 2, a portion of network 100 is shown in which the example block diagrams of the hub 130(2) and the customer premise 150 are depicted in greater detail. Customer premise 150 further houses an IP set top box 210 coupled to CM 140(1) and a television (TV) 216. In another example, the coax cable entering the customer premise 150 may be split by a splitter (not shown) and routed to other set top boxes. The CM 140(1) is also connected to a local area network (LAN) 213. The LAN 213 may connect to other wired/wireless devices (e.g., personal computers (PCs) or personal data assistants (PDAs), IP televisions, etc.) and may serve as a gateway or access point through which additional PCs or consumer devices have access to data network facilities and Internet Protocol television services. IP set top box 210 receives media content over IP and de-encapsulates the media content. IP set top box 210 further decrypts and decodes the media content to produce analog video (e.g., component video, composite video, etc.) and analog audio, or digital video/audio (e.g., digital video interface (DVI) signals) for transmission to TV 216.

Hub 130(2) further contains a CMTS, e.g., CMTS 190, and a combiner 220 and a splitter 223. Combiner 220 combines various analog and digital signals for transport to customer premise 150 via an optical/electrical (O/E) node 226. Splitter 223 splits the signal coming from O/E node 226 into various components. O/E node 286 communicates via optical fiber to hub 130(2) and via coaxial (coax) cable to customer premise 150 in a hybrid fiber coax (HFC) network. O/E node 226 may reside anywhere between hub 130(2) and customer premise 150, or alternatively, coax may connect hub 130(2) to customer premise 150 without using optical fiber.

CMTS 190 is used to provide high speed data services including cable Internet, voice over IP (VoIP), and Internet Protocol television services to various subscribers. CMTS 210 comprises a central processing unit (CPU) 230 and a memory unit 240 for implementing the CMTS object tagging process logic 300, as described below. Although the CMTS 210 is described with respect to one processor, it should be understood the CMTS 210 may comprise a plurality of processors for handling various functions, e.g., the CMTS 210 may have a processor for networking functions and a processor for CM management functions. CMTS 190 may also house an optical carrier unit 250, Ethernet unit 260, a Telco interface unit 270, and a DOCSIS unit 280. Memory unit 240 stores data and/or software or processor instructions that are executed to carry out the embodiments described herein (e.g., for implementing process logic 300).

The CPU 230 is a data processing device, e.g., a microprocessor, microcontroller, systems on a chip (SOCs), or other fixed or programmable logic. The CPU 230 interfaces with the memory unit 240 that may be any form of random access memory (RAM), non-volatile memory (NVM), or other data storage block that stores data used for the techniques described herein. The memory 240 may be separate or part of the CPU 230. Instructions for performing the CMTS object tagging process logic 300 may be stored in the memory 240 for execution by the CPU 230.

The functions of the CPU 230 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 240 stores data used for the computations or functions described herein (and/or to store software or processor instructions that are executed to carry out the computations or functions described herein). Thus, the process 300 may be implemented with fixed logic or programmable logic (e.g., software/computer instructions executed by a processor or field programmable gate array (FPGA)), or the processor readable tangible medium may be encoded with instructions that, when executed by a processor, cause the processor to execute the process 300.

Units 230-280 may be circuit cards with embedded software or firmware that plug into a common chassis and communicate over a common bus 290 (e.g., a peripheral component interconnect (PCI) or VME type bus), or units 230-280 may be implemented by any conventional or other computer systems preferably equipped with a processor, memories and/or internal or external communications devices (e.g., modem, network cards, etc.) that comply with the DOCSIS standard.

The firmware or software for units 230-280 may be updated locally or remotely using various networking components. In addition, the software for the techniques described herein (e.g., the CMTS object tagging process logic 300, etc.) may be available on a recordable medium (e.g., magnetic, optical, floppy, DVD, CD, etc.), or downloadable from a source via a communication medium (e.g., bulletin board, network, WAN, LAN, Intranet, Internet, etc.)

Optical carrier unit 250 may communicate with HEF 110 or Internet 170 over network 120 using one of various SONET, SDH, or other protocols, such as OC-48 or OC-192 (in the U.S. and Canada), and STM-16 or STM-64 (outside of the U.S. and Canada). Ethernet unit 260 is used for communication with local networking components (not shown), and in one example embodiment with a Trivial File Transfer Protocol (TFTP) server for the retrieval of CM configuration files. Telco unit 270 converts VoIP from customer premise 150 to analog signals for transmission over PSTN 180. DOCSIS unit 280 is the CMTS 190's interface to CM 140(1) for digital data signals communicated between the CMTS 190, and the CM 140(1) or the IP set top box 210. Any hub in system 100 may include a CMTS provisioned to implement CMTS object tagging process logic 300 and may be configured in a manner similar to hub 130(2).

Devices with embedded systems like the CMTS 190 are usually managed or configured remotely using Simple Network Management Protocol (SNMP) or through a command line interface (CLI), e.g., using a Telnet or Secure Shell (SSH) session. Various applications may also interface with the CMTS 190 to perform various management or configuration functions. The CMTS manages, among other things, CMs within its media access control (MAC) space, certain entities beyond the CM, service flows, sessions, and bandwidth assigned to the CMTS, e.g., the CMTS may perform load balancing and channel bonding functions for the CMs within its MAC space. The entities that the CMTS manages are referred to herein as objects, entities, or configurable objects.

For ease of illustration, the tagging techniques described herein will be described in connection with configuring or managing CMs in the context of load balancing. It should be understood, however, that these techniques apply equally well to other objects managed by the CMTS, e.g., bandwidth, channel bonding groups, edge quadrature amplitude modulator (EQAM) interface parameters, etc. In other words, the techniques described herein are extensible to other configurable objects.

The DOCSIS specification requires a CMTS to perform autonomous load balancing. The CMTS performs load balancing by creating multiple upstream and downstream load balance groups (LBGs). When a CM comes online the CMTS assigns the CM to an LBG during CM registration. The CMTS may subsequently change the CM's receive channel set and/or transmit channel set to other channels within the assigned LBG to balance the load across QAM channels or channel bonding groups.

When a CM comes online it will perform Dynamic Host Configuration Protocol (DHCP) discovery to retrieve an IP address assignment. The CM then accesses a TFTP server to retrieve its configuration file. The CM configuration file defines operational parameters for the CM. DOCSIS specifies type, length, value (TLV) parameters within the CM configuration file. For example, TLV 24 defines a configuration for an upstream service flow for the CM and is followed by a number of parameters (sub-TLVs) associated with the upstream service flow, e.g., quality of service type, maximum traffic rate, flow reference number, etc. When the CM reads its configuration file it would initially configure its upstream service flow according to the TLV 24 upstream service flow parameters.

At this point, in order to change the upstream service flow configuration for the CM the CMTS must send a command to the CM, or the cable system operator or other application may log into the CMTS and change the upstream service flow configuration via CLI or SNMP commands. To permanently change the upstream service flow configuration the CM configuration file must be edited. Editing each configuration file for thousands of CMs is a cumbersome process and cable system operators are reluctant to do so.

The DOCSIS specification also provides TLV 43 (and certain load balancing sub-TLVs) for load balancing, e.g., load balancing group identification (ID), load balancing priority, CM service type ID, multicast authorization, etc. TLV 43 and the other TLVs essentially classify CMs into different categories, e.g., CMs that belong to a certain LBG or multicast group. However, cable system operators do not want to edit thousands of CM configuration files on a regular basis. In the realm of dynamic load balancing, cable system operators would prefer to dynamically classify CMs, e.g., using tagging, and have a software application perform a management function. In general, applications that create tags are referred to herein as "feeder" applications and applications that perform a management function are referred to as "consumer" applications.

In one example, CMs may be classified according to DOCSIS version, firmware version, MAC Organizationally Unique Identifier (OUI), device type, service type, multicast group, etc. In the past, certain classification functions and associated commands were in great need, e.g., "all wideband modems—reset". These classification functions and commands were incorporated directly into the operating system (OS), i.e., the embedded nature of the CMTS required these classification features to be hardcoded in the OS. Each new classification feature would then require new software or firmware for the CMTS along with a CMTS reboot, or require a CM configuration file to be edited.

Figure 3:
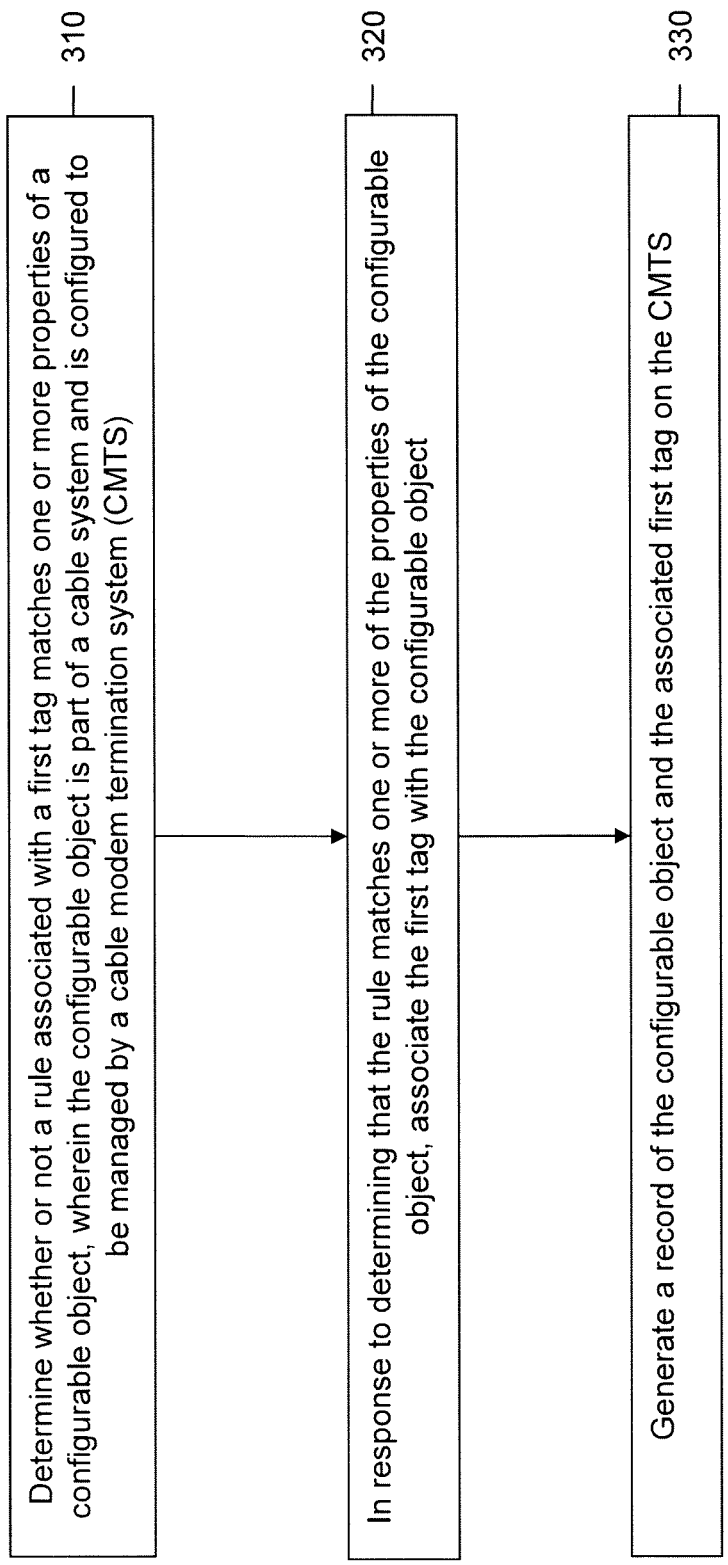
FIG. 3 depicts an example flow chart of the CMTS object tagging process logic.

The techniques described herein provide a way of avoiding OS updates and CM configuration file edits by implementing a general rule-based tagging scheme. Turning now to FIG. 3, CMTS object tagging process logic 300 will now be described. At 310, a determination is made as to whether a rule associated with a first tag matches one or more properties of a configurable object, where the configurable object is part of a cable system and is configured to be managed by a CMTS. In one example, a rule, e.g., "rule_1" is associated with a tag, e.g., "tag_1". Rule_1 may be, e.g., "include all CMs with firmware version 1.2.3".

At 320, in response to determining that the rule matches one or more of the properties of the configurable object, the first tag is associated with the configurable object. In the example above, all CMs with firmware version 1.2.3 would be associated with tag_1. At 330, a record of the configurable object and the associated first tag is generated or stored within the CMTS. Once the record is stored then the information is available to the cable system operator or an application that interfaces with the CMTS. In one example, if the cable system operator wants to upgrade CMs with firmware version 1.2.3 to firmware version 2.0, an application can access the tag records and easily determine all CMs with firmware version 1.2.3, and then upgrade them all to firmware version 2.0 at the same time.

Tags may be created via the CLI, SNMP, or any feeder application that interfaces with the CMTS. Tags may also be created by the CMTS at run time when it loads its own configuration file, e.g., from a flash disk or network device. Referring to FIG. 4, an example table is shown that generally depicts the relationship between tags, their priority, and rules associated with the tags. At 410, Tag IDs are shown for a plurality of tags, e.g., tag_1 through tag_x. At 420, each tag is assigned a priority. There is no particular significance to the priorities shown, i.e., lower or higher numbers may be associated with a lower or higher priority, and vice versa. Multiple tags may be assigned to an object. When multiple tags are assigned to an object, the tags may be sorted by priority and operations may be performed on the object according to tag priority. At 430, one or more rules are associated with each tag. In the case that a tag has multiple rules, the CMTS attaches or associates the tag with the object only if the object matches all of the rules of the tag. At 440, a nested tag is shown. In this example tag_2-1 is nested within tag_2 and acquires tag_2's priority. The association between tag_2-1 and tag_2 may in and of itself be made by a rule. Conceptually, rules in nested tags are logically ANDed together when applied to an object.

Figure 5:
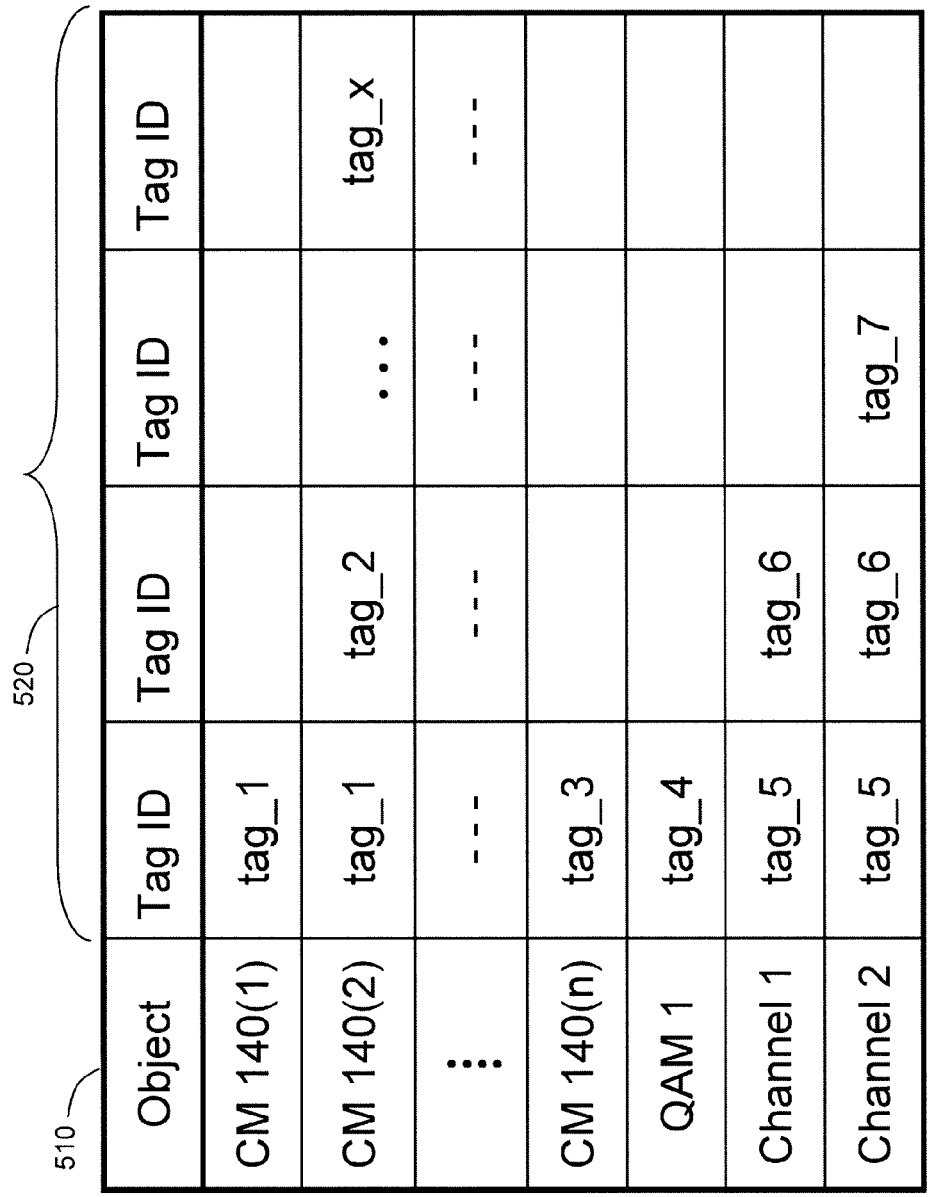
FIG. 5 is an example table that generally depicts a relationship between objects and their associated tags.

Referring to FIG. 5, an example table is shown that generally depicts the relationship between objects and the tags associated with the objects. At 510, the list of objects includes cable modems 140(1)-140(n) from FIG. 1, a QAM 1 interface, and RF channels 1 and 2. At 520, each of the objects listed in column 510 has one or more associated tags. Tags may also be defined for an object type, e.g., CM type, channel type, or other enumerated types.

Once a tag is associated with an object then the object may be manipulated, managed, or otherwise configured by a consumer application, or the CMTS itself. By way of example, a command may be received at the CMTS to perform a management function or operation that may be applied to all CMs with a certain tag, to all CMs with a certain set of tags, or to all CMs with a certain tag that has the highest, lowest, or intermediate priority among all the associated tags. Thus, managing a configurable object by way of the techniques described herein, the need for specific OS modifications or configuration file changes is greatly reduced or eliminated. In other words, application specific operations are decoupled from the OS and the configuration files, i.e., the operations are extensible by allowing the separation of classification and operation methods, and at the same time the feeder applications may also generate their own object classifications.

It should be noted that the tables shown in FIGS. 4 and 5, or similar records may be stored in volatile or non-volatile memory, or in text files and used for batch processing. Inherent to the techniques described herein is the fact that the objects, and associated rules and tags, may be part of a system design or specification, and are known to or dynamically created by the consumer or feeder applications.

Figure 6:
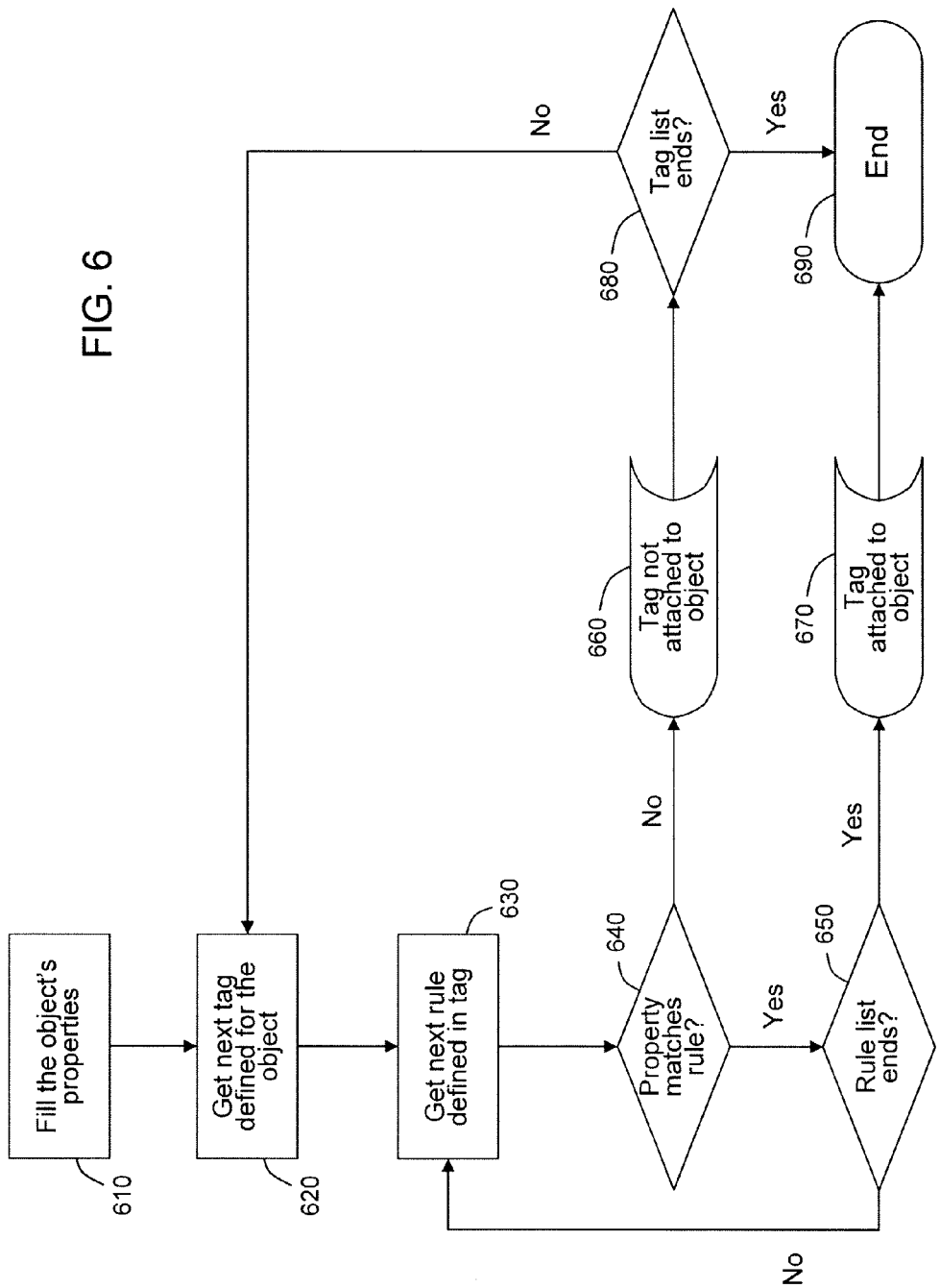
FIG. 6 depicts an example flow chart of a specific example of the CMTS object tagging process logic using a single tag mode.

Turning to FIG. 6, an example flow chart of a specific example of the CMTS object tagging process logic using a single tag mode will now be described. In the single tag mode only one tag per object is allowed. When an object has multiple tags, the order or priority of the multiple tags is important since only the first matching tag will be allowed to be attached or associated with the object while in single tag mode. Single tag mode uses less memory and runs faster due to its lower complexity relative to the multiple tag mode. At 610, the object properties are filled into memory or otherwise obtained. For example, with a CM, some of its properties are hardcoded, e.g., the MAC OUI, firmware version, etc., and some of its properties are obtained by a CM via a configuration file as described above. Initially, the CMTS has no knowledge about the CM's properties and the CM conveys them to the CMTS during the registration process. Upon receiving these properties, the CMTS can decode them and record them in memory. This process is not part of the general tagging logic, which reads a CM's properties and matches the properties against rules and does not manipulating these properties (which is left to the consumer application).

At 620, the next tag defined for the object (or object type) is obtained. The tags may be contained in a tag list. At 630, the next rule defined in the tag is obtained. The rules may also be contained in a rule list. At 640, one or more of the objects properties are compared to the rule to obtain a match. If the properties of the object do not match the rule, then at 660, the tag is not attached or associated with the object. At 680, the tag list is parsed to see if the tag list ends. If the tag list ends, then at 690, the process ends, otherwise the process returns to 620 in order to get the next tag in the tag list.

Referring back to 640, if the properties of the object match the rule, then at 650, the rule list is parsed to see if the rule list ends. If the rule list does not end then the process returns to 630 and the next rule associated with the tag is obtained. If the rule list ends, then at 670, the tag, already having matched a rule, is attached or associated with the object. More specifically, a record of the object and associated tag is stored, and at 690, the process ends. It should be noted that the above describe processes may also detect a previously generated object/tag/nested-tag record that is no longer valid. In this case, the record may be deleted.

In another example, the CMTS object tagging process logic can be used for dynamic load balancing. At the CLI, a user defines an LBG, e.g., lbg__1. Next, the user defines a tag, e.g., tag__1. The user next creates a rule, e.g., rule__1, that states "exclude service-type-id commercial". Note that the rule may contain a verb "exclude", an attribute type "service-type-id" and an identifier "commercial". The user would then associate tag__1 with lbg__1. In this example all CMs with a service type id of "commercial" would be excluded from lbg__1. Any "commercial" CMs that are part of lbg__1 may then be switched to another LBG, e.g., using a dynamic channel change operation.

Figure 7:
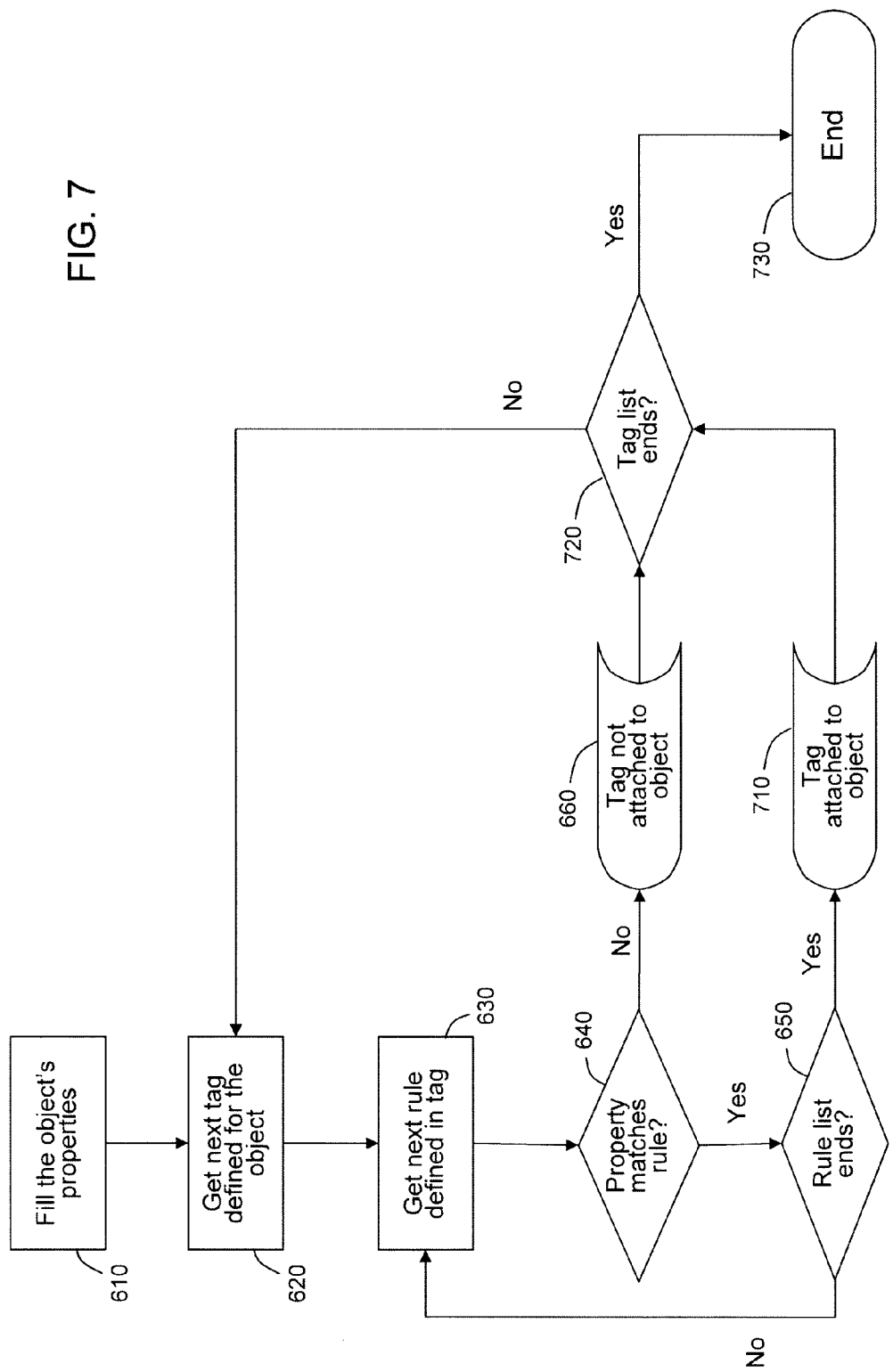
FIG. 7 depicts an example flow chart of a specific example of the CMTS object tagging process logic using a multiple tag mode.

Turning now to FIG. 7, an example flow chart of a specific example of the CMTS object tagging process logic using a multiple tag mode will now be described. In the multiple tag mode one or more tags per object is allowed. The flowchart in FIG. 7 depicts steps 610 through 660 from FIG. 6, and these steps operate in substantially the same way as described in connection with FIG. 6. At 710, once a tag is attached to or associated with an object the process does not end, but proceeds to 720, where it is determined if the tag list ends. If the tag list ends, then at 730, the process ends, otherwise the process continues at 620 to determine if a second tag might be attached or associated with the object.

In another example, a plurality of modems may be part of the same multicast group, e.g., they all may be receiving the same IPTV program, but not necessarily on the same channel. In addition, some CMs in the same multicast group may be in one LBG and other CMs may be in another LBG. The cable system operator would like to make efficient use of the available downstream bandwidth. In this example, the cable system operator can tag the CMs with the multicast group ID and LBG ID. To save downstream bandwidth all the CMs receiving the multicast can be switched to the same RF channel and LBG.

Techniques have been described above for allowing cable system operators to gain flexibility when managing object associated with a CMTS by using a general tagging scheme, and thereby avoiding the need for custom operating systems or cable modem configuration files.

The above description is by way of example only.

What is claimed is:

1. A method comprising:
    associating one or more rules with one or more tags, wherein each tag represents a label for a property of a configurable object;
    determining whether a rule associated with a first tag matches one or more properties of at least two configurable objects, wherein the configurable objects are configured to be managed by a cable modem termination system (CMTS);
    in response to determining that the rule matches one or more of the properties of the configurable objects, associating the first tag with each of the configurable objects;
    generating a record within the CMTS indicating that the first tag is associated with each of the configurable objects; and
    configuring the at least two configurable objects using the first tag.

2. The method of claim 1, further comprising:
    determining whether a rule associated with a second tag matches one or more properties of at least one of the configurable objects;
    in response to determining that the rule associated with the second tag matches one or more of the properties of the at least one configurable object, associating the second tag with the at least one configurable object; and
    updating the record within the CMTS indicating that the second tag is associated with the at least one configurable object.

3. The method of claim 1, wherein a plurality of rules are associated with the first tag, and wherein determining comprises determining whether all of the rules match one or more of the properties of the configurable objects.

4. The method of claim 1, wherein in response to determining that the rule does not match one of the properties of at least one of the configurable objects, deleting a record within the CMTS indicating that the first tag is associated with the at least one configurable object.

5. The method of claim 1, further comprising:
    determining whether a rule associated with a second tag that is nested within the first tag matches one or more properties of at least one of the configurable objects;
    in response to determining that the rules associated with the first and second tags both match one or more of the properties of the at least one configurable object, associating the first and/or second tags with the at least one configurable object; and
    generating a record within the CMTS indicating that first and/or second tags are associated with the at least one configurable object.

6. The method of claim 1, further comprising:
   receiving a command at the CMTS to perform a management function on one or more configurable objects that are identified by one or more tags; and
   performing the management function on the one or more configurable objects.

7. The method of claim 6, further comprising assigning a priority to the one or more tags, and wherein performing comprises performing the management function on the set of configurable objects based on the priority assigned to each of the one or more tags.

8. An apparatus comprising an embedded system with a processor configured to:
   associate one or more rules with one or more tags, wherein each tag represents a label for a property of a configurable object;
   determine whether a rule associated with a first tag matches one or more properties of at least two configurable objects;
   associate the first tag with each of the configurable objects when it is determined that the rule matches one or more of the properties of the at least two configurable objects;
   generate a record indicating that the first tag is associated with each of the configurable objects; and
   configure the at least two configurable objects using the first tag.

9. The apparatus of claim 8, wherein the processor is further configured to:
   determine whether a rule associated with a second tag matches one or more properties of at least one of the configurable objects;
   associate the second tag with the at least one configurable object when it is determined that the rule associated with the second tag matches one or more of the properties of the at least one configurable object; and
   update the record to indicate that the second tag is associated with the at least one configurable object.

10. The apparatus of claim 8, wherein the processor is configured to determine whether all of a plurality of rules associated with the first tag match one or more properties of the configurable objects.

11. The apparatus of claim 8, wherein the processor is further configured to:
   determine whether a rule associated with a first tag does not match one or more properties of at least one of the configurable objects; and
   delete a record indicating that the first tag is associated with the at least one configurable object.

12. The apparatus of claim 8, wherein the processor is further configured to:
   determine whether a rule associated with a second tag that is nested within the first tag matches one or more properties of at least one of the configurable objects;
   associate the first and/or second tags with the at least one configurable object when it is determined that the rules associated with the first and second tags both match one or more of the properties of the at least one configurable object; and
   generate a record indicating that first and/or second tags are associated with the at least one configurable object.

13. The apparatus of claim 8, wherein the processor is further configured to:
   receive a command to perform a management function on one or more configurable objects that are identified by one or more tags; and
   perform the management function on the one or more configurable objects.

14. The apparatus of claim 13, wherein the processor is further configured to assign a priority to the one or more tags, and wherein the processor is configured to perform the management function on the set of configurable objects based on the priority assigned to each of the one or more tags.

15. A non-transitory processor readable medium storing instructions that, when executed by a processor, cause the processor to:
   associate one or more rules with one or more tags, wherein each tag represents a label for a property of a configurable object;
   determine whether a rule associated with a first tag matches one or more properties of at least two configurable objects;
   associate the first tag with each of the configurable object when it is determined that the rule matches one or more of the properties of the configurable objects;
   generate a record indicating that the first tag is associated with each of the configurable objects; and
   configure the at least two configurable objects using the first tag.

16. The non-transitory processor readable medium of claim 15, and further comprising instructions that, when executed by a processor, cause the processor to:
   determine whether a rule associated with a second tag matches one or more properties of at least one of the configurable objects;
   associate the second tag with the at least one configurable object when it is determined that the rule associated with the second tag matches one or more of the properties of the at least one configurable object; and
   update the record to indicate that the second tag is associated with the at least one configurable object.

17. The non-transitory processor readable medium of claim 15, wherein the instructions that determine comprise instructions to determine whether all of a plurality of rules associated with the first tag match one or more properties of the configurable objects.

18. The non-transitory processor readable medium of claim 15, and further comprising instructions that, when executed by a processor, cause the processor to:
   determine whether a rule associated with a first tag does not match one or more properties of at least one of the configurable objects; and
   delete a record indicating that the first tag is associated with the at least one configurable object.

19. The non-transitory processor readable medium of claim 16, and further comprising instructions that, when executed by a processor, cause the processor to:
   determine whether a rule associated with a second tag that is nested within the first tag matches one or more properties of at least one of the configurable objects;
   associate the first and/or second tags with the at least one configurable object when it is determined that the rules associated with the first and second tags both match one or more of the properties of the at least one configurable object; and
   generate a record indicating that first and/or second tags are associated with the at least one configurable object.

20. The non-transitory processor readable medium of claim 16, and further comprising instructions that, when executed by a processor, cause the processor to:
   receive a command to perform a management function on one or more configurable objects that are identified by one or more tags; and
   perform the management function on the one or more configurable objects.

21. The non-transitory processor readable medium of claim 20, and further comprising instructions that, when executed by a processor, cause the processor to assign a priority to the one or more tags, and wherein the instructions that perform comprise instructions to perform the management function on the set of configurable objects based on the priority assigned to each of the one or more tags.

\* \* \* \* \*